(12) United States Patent
Pereira et al.

(10) Patent No.: US 9,723,319 B1
(45) Date of Patent: Aug. 1, 2017

(54) DIFFERENTIATION FOR ACHIEVING BUFFERED DECODING AND BUFFERLESS DECODING

(75) Inventors: Rui Filipe Andrade Pereira, Aliso Viejo, CA (US); Andrew Buchanan Gault, Pescara (IT)

(73) Assignee: Sony Interactive Entertainment America LLC, San Mateo, CA (US)

( * ) Notice: Subject to any disclaimer, the term of this patent is extended or adjusted under 35 U.S.C. 154(b) by 1308 days.

(21) Appl. No.: 12/790,948

(22) Filed: May 31, 2010

Related U.S. Application Data

(60) Provisional application No. 61/183,035, filed on Jun. 1, 2009, provisional application No. 61/183,037, filed on Jun. 1, 2009, provisional application No. 61/183,088, filed on Jun. 2, 2009, provisional application No. 61/183,546, filed on Jun. 2, 2009, provisional application No. 61/323,354, filed on Apr. 12, 2010, provisional application No. 61/345,534, filed on May 17, 2010.

(51) Int. Cl.
　　*H04N 19/44*　　(2014.01)
　　*H04N 19/42*　　(2014.01)
　　*H04N 19/46*　　(2014.01)
　　*H04N 19/70*　　(2014.01)
　　*H04N 19/136*　　(2014.01)

(52) U.S. Cl.
　　CPC .......... *H04N 19/44* (2014.11); *H04N 19/136* (2014.11); *H04N 19/42* (2014.11); *H04N 19/46* (2014.11); *H04N 19/70* (2014.11)

(58) Field of Classification Search
　　CPC ...... H04N 19/70; H04N 19/42; H04N 19/159; H04N 19/136; H04N 19/44; H40N 19/46
　　See application file for complete search history.

(56) References Cited

U.S. PATENT DOCUMENTS

| | | |
|---|---|---|
| 4,372,558 A | 2/1983 | Shimamoto et al. |
| 5,263,723 A | 11/1993 | Pearson et al. |
| 5,411,270 A | 5/1995 | Naka et al. |
| 5,553,864 A | 9/1996 | Sitrick |
| 5,558,339 A | 9/1996 | Perlman |
| 5,586,247 A | 12/1996 | Yoshifuji et al. |

(Continued)

FOREIGN PATENT DOCUMENTS

| | | |
|---|---|---|
| EP | 1104686 A1 | 6/2001 |
| EP | 1479422 A2 | 11/2004 |

(Continued)

OTHER PUBLICATIONS

Unknown, "*T5 Labs Reveals Instant Gaming Platform*", Article Nov. 9, 2007, p. 1-8, http://www.edge-online.com.

(Continued)

*Primary Examiner* — Behrooz Senfi
*Assistant Examiner* — Maria Vazquez Colon
(74) *Attorney, Agent, or Firm* — Martine Penilla Group, LLP

(57) ABSTRACT

Systems and methods of managing H.264 compliant video that lacks B Frames include decoding without the use of a significant video frame buffer. This variant of the H.264 standard may include a flag indicating that the video does not include B Frames. The video may be used in applications, such as computer games, in which processing of B Frames introduces undesirable lag.

17 Claims, 3 Drawing Sheets

(56) References Cited

U.S. PATENT DOCUMENTS

| | | |
|---|---|---|
| 5,623,424 A | 4/1997 | Azadegan et al. |
| 5,636,209 A | 6/1997 | Perlman |
| 5,641,319 A | 6/1997 | Stoel et al. |
| 5,685,775 A | 11/1997 | Bakoglu et al. |
| 5,689,577 A | 11/1997 | Arata |
| 5,696,892 A | 12/1997 | Redmann et al. |
| 5,707,286 A | 1/1998 | Carlson |
| 5,738,583 A | 4/1998 | Comas et al. |
| 5,742,289 A | 4/1998 | Naylor et al. |
| 5,775,996 A | 7/1998 | Othmer et al. |
| 5,790,713 A | 8/1998 | Kamada et al. |
| 5,793,985 A | 8/1998 | Natarajan et al. |
| 5,828,370 A | 10/1998 | Moeller et al. |
| 5,846,132 A | 12/1998 | Junkin |
| 5,852,672 A | 12/1998 | Lu |
| 5,878,283 A | 3/1999 | House et al. |
| 5,884,101 A | 3/1999 | Wu |
| 5,889,499 A | 3/1999 | Nally et al. ............... 345/7 |
| 5,899,810 A | 5/1999 | Smith |
| 5,905,988 A | 5/1999 | Schwartz et al. |
| 5,926,208 A | 7/1999 | Noonen et al. |
| 5,956,485 A | 9/1999 | Perlman |
| 5,966,129 A | 10/1999 | Matsukuma et al. |
| 5,974,442 A | 10/1999 | Adams |
| 5,974,503 A | 10/1999 | Venkatesh et al. |
| 5,991,443 A | 11/1999 | Gallery et al. |
| 6,005,561 A | 12/1999 | Hawkins et al. |
| 6,015,344 A | 1/2000 | Kelly et al. |
| 6,025,801 A | 2/2000 | Beitel |
| 6,039,648 A | 3/2000 | Guinn et al. |
| 6,050,898 A | 4/2000 | Vange et al. |
| 6,102,969 A | 8/2000 | Christianson et al. ....... 717/146 |
| 6,115,038 A | 9/2000 | Christofferson et al. |
| 6,128,660 A | 10/2000 | Grimm et al. |
| 6,152,824 A | 11/2000 | Rothschild et al. |
| 6,210,274 B1 | 4/2001 | Carlson |
| 6,238,290 B1 | 5/2001 | Tarr et al. |
| 6,241,612 B1 | 6/2001 | Heredia ................. 463/42 |
| 6,272,223 B1 | 8/2001 | Carlson |
| 6,300,952 B1 | 10/2001 | Sidwell et al. |
| 6,342,892 B1 | 1/2002 | Van Hook et al. ........... 345/503 |
| 6,370,564 B2 | 4/2002 | Bretscher |
| 6,390,922 B1 | 5/2002 | Vange et al. |
| 6,409,602 B1 | 6/2002 | Wiltshire et al. |
| 6,415,317 B1 | 7/2002 | Yelon et al. |
| 6,426,748 B1 | 7/2002 | Megahed |
| 6,428,413 B1 | 8/2002 | Carlson |
| 6,453,334 B1 | 9/2002 | Vinson et al. |
| 6,475,090 B2 | 11/2002 | Roelofs |
| 6,539,354 B1 | 3/2003 | Sutton et al. |
| 6,587,109 B1 | 7/2003 | Rose et al. |
| 6,606,746 B1 | 8/2003 | Zdepski et al. |
| 6,665,453 B2 | 12/2003 | Scheurich |
| 6,665,872 B1 | 12/2003 | Krishnamurthy et al. |
| 6,687,663 B1 | 2/2004 | McGrath et al. |
| 6,754,241 B1 | 6/2004 | Krishnamurthy et al. |
| 6,755,743 B1 | 6/2004 | Yamashita et al. |
| 6,763,371 B1 | 7/2004 | Jandel |
| 6,791,579 B2 | 9/2004 | Markel |
| 6,792,615 B1 | 9/2004 | Rowe et al. |
| 6,810,528 B1 | 10/2004 | Chatani |
| 6,848,997 B1 | 2/2005 | Hashimoto et al. |
| 6,863,612 B2 | 3/2005 | Willis |
| 6,884,172 B1 | 4/2005 | Lloyd et al. |
| 6,908,390 B2 | 6/2005 | Nguyen et al. |
| 6,918,113 B2 | 7/2005 | Patel et al. |
| 6,959,320 B2 | 10/2005 | Shah et al. |
| 6,963,353 B1 | 11/2005 | Firestone |
| 6,970,910 B2 | 11/2005 | Murai |
| 6,986,055 B2 | 1/2006 | Carlson |
| 6,996,742 B2 | 2/2006 | Lerman et al. |
| 7,023,918 B2 | 4/2006 | Yu et al. |
| 7,038,676 B2 | 5/2006 | Iwata et al. |
| 7,043,524 B2 | 5/2006 | Shah et al. |
| 7,062,567 B2 | 6/2006 | Benitez et al. |
| 7,072,693 B2 | 7/2006 | Farlow et al. |
| 7,075,993 B2 | 7/2006 | O'Brien, Jr. |
| 7,090,577 B2 | 8/2006 | Serizawa et al. ................ 463/6 |
| 7,096,253 B2 | 8/2006 | Vinson et al. ................ 709/203 |
| 7,133,368 B2 | 11/2006 | Zhang et al. |
| 7,135,985 B2 | 11/2006 | Woolgar et al. |
| 7,158,679 B2 | 1/2007 | Sano et al. |
| 7,227,894 B2 | 6/2007 | Lin et al. ................. 375/240.12 |
| 7,240,162 B2 | 7/2007 | de Vries |
| 7,246,183 B2 | 7/2007 | Covington et al. |
| 7,260,834 B1 | 8/2007 | Carlson |
| 7,270,605 B2 | 9/2007 | Russell et al. |
| 7,274,368 B1 | 9/2007 | Keslin |
| 7,275,987 B2 | 10/2007 | Shimakawa et al. ............ 463/9 |
| 7,292,588 B2 | 11/2007 | Milley et al. |
| 7,295,608 B2 | 11/2007 | Reynolds et al. |
| 7,297,062 B2 | 11/2007 | Gatto et al. |
| 7,299,487 B1 | 11/2007 | Campbell et al. |
| 7,305,697 B2 | 12/2007 | Alao et al. |
| 7,325,066 B1 * | 1/2008 | Fuller ............... H04L 29/06027 370/429 |
| 7,448,063 B2 | 11/2008 | Freeman et al. ............. 725/136 |
| 7,451,196 B1 | 11/2008 | de Vries et al. |
| 7,577,751 B2 | 8/2009 | Vinson et al. |
| 7,587,520 B1 | 9/2009 | Kent et al. |
| 7,721,117 B2 | 5/2010 | Sherer et al. |
| 7,731,586 B2 | 6/2010 | Letovsky et al. |
| 7,739,715 B2 | 6/2010 | He et al. |
| 7,751,480 B2 | 7/2010 | Yavits et al. |
| RE41,618 E | 8/2010 | Florschuetz |
| 7,804,856 B2 | 9/2010 | Krause et al. ................ 370/486 |
| 7,818,444 B2 | 10/2010 | Brueck et al. |
| 7,818,769 B2 | 10/2010 | Peacock et al. ................ 725/54 |
| 7,864,186 B2 | 1/2011 | Robotham et al. |
| 7,877,776 B2 | 1/2011 | Krikorian et al. |
| 7,916,147 B2 | 3/2011 | Clemie et al. |
| 7,936,819 B2 | 5/2011 | Craig et al. |
| 7,953,883 B2 | 5/2011 | Thomas et al. ............. 709/231 |
| 8,081,192 B2 | 12/2011 | Clemie et al. |
| 8,095,400 B2 | 1/2012 | Herde et al. ................ 705/5 |
| 8,152,631 B2 | 4/2012 | Anderson .................. 463/25 |
| 8,203,568 B2 | 6/2012 | Clemie et al. |
| 2001/0044339 A1 | 11/2001 | Cordero et al. |
| 2002/0030675 A1 | 3/2002 | Kawai |
| 2002/0034980 A1 | 3/2002 | Lemmons et al. |
| 2002/0051581 A1 * | 5/2002 | Takeuchi et al. ............ 382/240 |
| 2002/0053075 A1 | 5/2002 | Paz et al. |
| 2002/0056120 A1 | 5/2002 | McTernan et al. |
| 2002/0059637 A1 | 5/2002 | Rakib |
| 2002/0061062 A1 | 5/2002 | O'Brien |
| 2002/0073429 A1 | 6/2002 | Beane et al. |
| 2002/0075382 A1 | 6/2002 | Cohen |
| 2002/0083461 A1 | 6/2002 | Hutcheson et al. |
| 2002/0111212 A1 | 8/2002 | Muir |
| 2002/0115487 A1 | 8/2002 | Wells |
| 2002/0128065 A1 | 9/2002 | Chung et al. |
| 2002/0154691 A1 | 10/2002 | Kost et al. |
| 2002/0166911 A1 | 11/2002 | Rajewski |
| 2002/0184303 A1 | 12/2002 | Uner |
| 2002/0186769 A1 | 12/2002 | O'Brien |
| 2002/0191699 A1 | 12/2002 | O'Brien |
| 2002/0191701 A1 | 12/2002 | O'Brien, Jr. |
| 2003/0004882 A1 | 1/2003 | Holler et al. |
| 2003/0037156 A1 | 2/2003 | Mallart |
| 2003/0048808 A1 | 3/2003 | Stahl et al. |
| 2003/0056112 A1 | 3/2003 | Vinson et al. |
| 2003/0060285 A1 | 3/2003 | Itakura |
| 2003/0072370 A1 | 4/2003 | Girod et al. |
| 2003/0083132 A1 | 5/2003 | Berg et al. ................... 463/40 |
| 2003/0093806 A1 | 5/2003 | Dureau et al. |
| 2003/0130040 A1 | 7/2003 | Dripps |
| 2003/0152080 A1 | 8/2003 | O'Brien |
| 2003/0174772 A1 | 9/2003 | Voronov et al. |
| 2003/0174774 A1 | 9/2003 | Mock et al. |
| 2003/0177187 A1 | 9/2003 | Levine et al. |
| 2003/0190952 A1 | 10/2003 | Smith et al. .................. 463/30 |
| 2003/0214502 A1 | 11/2003 | Park et al. |
| 2003/0228906 A1 | 12/2003 | Walker et al. ............... 463/40 |
| 2003/0234790 A1 | 12/2003 | Hochmuth et al. |

(56) References Cited

U.S. PATENT DOCUMENTS

| | | |
|---|---|---|
| 2004/0022391 A1 | 2/2004 | O'Brien |
| 2004/0034870 A1 | 2/2004 | O'Brien et al. |
| 2004/0052371 A1 | 3/2004 | Watanabe |
| 2004/0063498 A1 | 4/2004 | Oakes et al. |
| 2004/0064504 A1 | 4/2004 | Domschitz |
| 2004/0072091 A1 | 4/2004 | Mochizuki et al. |
| 2004/0102245 A1 | 5/2004 | Escalera et al. |
| 2004/0111755 A1 | 6/2004 | Perlman |
| 2004/0119716 A1 | 6/2004 | Park et al. |
| 2004/0125816 A1* | 7/2004 | Xu .................. H04N 21/44004 370/411 |
| 2004/0155962 A1 | 8/2004 | Marks |
| 2004/0209660 A1 | 10/2004 | Carlson et al. |
| 2004/0222988 A1 | 11/2004 | Donnelly |
| 2004/0252632 A1 | 12/2004 | Bourdoux et al. |
| 2005/0024363 A1 | 2/2005 | Estrop |
| 2005/0054423 A1 | 3/2005 | Wadleigh ........................ 463/20 |
| 2005/0080915 A1 | 4/2005 | Shoemaker et al. |
| 2005/0100229 A1 | 5/2005 | Becker et al. |
| 2005/0104543 A1 | 5/2005 | Kazanov et al. |
| 2005/0104889 A1 | 5/2005 | Clemie et al. |
| 2005/0125825 A1 | 6/2005 | Nakayama |
| 2005/0174771 A1 | 8/2005 | Conner |
| 2005/0193139 A1 | 9/2005 | Vinson et al. |
| 2005/0193209 A1 | 9/2005 | Saunders et al. |
| 2005/0282636 A1 | 12/2005 | O'Brien |
| 2005/0283734 A1 | 12/2005 | Santoro et al. |
| 2005/0286777 A1 | 12/2005 | Kumar et al. |
| 2006/0038879 A1 | 2/2006 | Kremen |
| 2006/0048136 A1 | 3/2006 | Vries et al. |
| 2006/0050972 A1 | 3/2006 | Reznic et al. |
| 2006/0069623 A1 | 3/2006 | MacDonald Korth et al. |
| 2006/0069796 A1 | 3/2006 | Lucas et al. |
| 2006/0069797 A1 | 3/2006 | Abdo et al. |
| 2006/0104353 A1 | 5/2006 | Johnson et al. |
| 2006/0117344 A1 | 6/2006 | Lamkin et al. |
| 2006/0121991 A1 | 6/2006 | Borinik et al. ................ 463/43 |
| 2006/0123185 A1 | 6/2006 | de Vries et al. |
| 2006/0126728 A1 | 6/2006 | Yu et al. |
| 2006/0146057 A1 | 7/2006 | Blythe .......................... 345/506 |
| 2006/0165235 A1 | 7/2006 | Carlson |
| 2006/0168294 A1 | 7/2006 | de Vries et al. |
| 2006/0195884 A1 | 8/2006 | van Zoest et al. |
| 2006/0218225 A1 | 9/2006 | Hee Voon et al. .......... 709/201 |
| 2006/0224761 A1 | 10/2006 | Howarth et al. ............ 709/231 |
| 2006/0230175 A1 | 10/2006 | de Vries |
| 2006/0230428 A1 | 10/2006 | Craig et al. .................... 725/133 |
| 2006/0258463 A1 | 11/2006 | Cugno et al. |
| 2006/0262979 A1 | 11/2006 | Srinivasan et al. |
| 2006/0282855 A1 | 12/2006 | Margulis |
| 2007/0005795 A1 | 1/2007 | Gonzalez |
| 2007/0009035 A1 | 1/2007 | Craig et al. |
| 2007/0011712 A1 | 1/2007 | White et al. |
| 2007/0036462 A1 | 2/2007 | Crandall et al. |
| 2007/0047901 A1 | 3/2007 | Ando et al. |
| 2007/0058937 A1 | 3/2007 | Ando et al. |
| 2007/0121629 A1 | 5/2007 | Cuijpers et al. |
| 2007/0155507 A1 | 7/2007 | Gatto et al. ..................... 463/42 |
| 2007/0168466 A1 | 7/2007 | Tooley et al. |
| 2007/0172133 A1 | 7/2007 | Kim et al. |
| 2007/0202941 A1 | 8/2007 | Miltenberger et al. |
| 2007/0211720 A1 | 9/2007 | Fuchs et al. |
| 2007/0226364 A1 | 9/2007 | Landspurg |
| 2007/0254742 A1 | 11/2007 | O'Brien |
| 2007/0260677 A1 | 11/2007 | DeMarco et al. |
| 2007/0265073 A1 | 11/2007 | Novi et al. |
| 2007/0265094 A1 | 11/2007 | Tone et al. ..................... 463/42 |
| 2007/0266170 A1 | 11/2007 | Mockett |
| 2007/0275780 A1 | 11/2007 | Sloate et al. |
| 2008/0008439 A1 | 1/2008 | Liu et al. |
| 2008/0015003 A1 | 1/2008 | Walker et al. |
| 2008/0025390 A1 | 1/2008 | Shi et al. |
| 2008/0032788 A1 | 2/2008 | Carlson |
| 2008/0039204 A1 | 2/2008 | Ackley et al. |
| 2008/0045338 A1 | 2/2008 | Walker et al. |
| 2008/0089423 A1 | 4/2008 | Karczewicz |
| 2008/0109876 A1 | 5/2008 | Hitomi et al. |
| 2008/0133715 A1 | 6/2008 | Yoneda et al. |
| 2008/0146342 A1 | 6/2008 | Harvey et al. |
| 2008/0178298 A1 | 7/2008 | Arai et al. |
| 2008/0194332 A1 | 8/2008 | Kadikario et al. |
| 2008/0194334 A1 | 8/2008 | Kuok et al. |
| 2008/0195743 A1 | 8/2008 | Brueck et al. |
| 2008/0207322 A1 | 8/2008 | Mizrahi ........................ 463/32 |
| 2008/0234047 A1 | 9/2008 | Nguyen ........................ 463/42 |
| 2008/0254891 A1 | 10/2008 | Saunders et al. |
| 2008/0261679 A1 | 10/2008 | Carlson |
| 2008/0268947 A1 | 10/2008 | Fyock et al. |
| 2008/0279183 A1 | 11/2008 | Wiley et al. |
| 2008/0284798 A1 | 11/2008 | Weybrew et al. ............ 345/630 |
| 2008/0287181 A1 | 11/2008 | Carlson |
| 2008/0288380 A1 | 11/2008 | Nam et al. |
| 2008/0291208 A1 | 11/2008 | Keall ............................ 345/506 |
| 2009/0010331 A1* | 1/2009 | Jeon .................... H04N 19/105 375/240.12 |
| 2009/0062014 A1 | 3/2009 | Gift et al. |
| 2009/0081964 A1 | 3/2009 | Buznach |
| 2009/0093312 A1 | 4/2009 | Carlson |
| 2009/0103607 A1 | 4/2009 | Bajpai et al. |
| 2009/0116558 A1* | 5/2009 | Chen et al. ............. 375/240.16 |
| 2009/0118017 A1 | 5/2009 | Perlman et al. ............... 463/42 |
| 2009/0118018 A1 | 5/2009 | Perlman et al. |
| 2009/0118019 A1 | 5/2009 | Perlman et al. |
| 2009/0119458 A1 | 5/2009 | de Vries et al. |
| 2009/0119644 A1 | 5/2009 | de Vries et al. |
| 2009/0119729 A1 | 5/2009 | Periman et al. |
| 2009/0119730 A1 | 5/2009 | Perlman et al. |
| 2009/0119731 A1 | 5/2009 | Perlman et al. |
| 2009/0119736 A1 | 5/2009 | Perlman et al. |
| 2009/0119737 A1 | 5/2009 | Perlman et al. |
| 2009/0119738 A1 | 5/2009 | Perlman |
| 2009/0122878 A1 | 5/2009 | Liu et al. |
| 2009/0124387 A1 | 5/2009 | Perlman et al. |
| 2009/0125961 A1 | 5/2009 | Perlman et al. |
| 2009/0125967 A1 | 5/2009 | Perlman et al. |
| 2009/0125968 A1 | 5/2009 | Perlman et al. |
| 2009/0131177 A1 | 5/2009 | Pearce |
| 2009/0147292 A1 | 6/2009 | Shimura et al. |
| 2009/0196516 A1 | 8/2009 | Perlman et al. |
| 2009/0213871 A1 | 8/2009 | Carlson et al. |
| 2009/0213927 A1 | 8/2009 | Perlman et al. |
| 2009/0213935 A1 | 8/2009 | Perlman et al. |
| 2009/0215531 A1 | 8/2009 | Perlman et al. |
| 2009/0215540 A1 | 8/2009 | Perlman et al. |
| 2009/0220001 A1 | 9/2009 | van der Laan et al. |
| 2009/0220002 A1 | 9/2009 | van der Laan et al. |
| 2009/0225076 A1 | 9/2009 | Vlietinck |
| 2009/0225220 A1 | 9/2009 | van der Laan et al. |
| 2009/0225828 A1 | 9/2009 | Perlman et al. |
| 2009/0225863 A1 | 9/2009 | Perlman et al. |
| 2009/0228936 A1 | 9/2009 | Davis et al. |
| 2009/0228946 A1 | 9/2009 | Perlman et al. |
| 2009/0234938 A1 | 9/2009 | Amsterdam et al. |
| 2009/0234940 A1 | 9/2009 | Pal et al. |
| 2009/0238267 A1 | 9/2009 | Li et al. |
| 2009/0238405 A1 | 9/2009 | Buznach |
| 2009/0239666 A1 | 9/2009 | Hall et al. |
| 2009/0244305 A1* | 10/2009 | Yoshida .................. H04N 19/39 348/220.1 |
| 2009/0245373 A1 | 10/2009 | Tourapis et al. |
| 2009/0247295 A1 | 10/2009 | Weldon et al. |
| 2009/0257668 A1 | 10/2009 | Ye et al. |
| 2009/0264202 A1 | 10/2009 | Chen et al. |
| 2009/0268821 A1 | 10/2009 | Au et al. |
| 2009/0276402 A1 | 11/2009 | Stiers ............................ 707/3 |
| 2009/0278842 A1 | 11/2009 | Peterfreund |
| 2009/0280908 A1 | 11/2009 | Carroll et al. |
| 2009/0289945 A1 | 11/2009 | Peterfreund et al. |
| 2009/0305790 A1 | 12/2009 | Lu et al. |
| 2009/0307367 A1 | 12/2009 | Gigliotti |
| 2009/0316783 A1* | 12/2009 | Au .......................... H04N 19/46 375/240.15 |
| 2009/0322784 A1 | 12/2009 | Sartori |
| 2010/0005503 A1 | 1/2010 | Kaylor et al. |

(56) References Cited

U.S. PATENT DOCUMENTS

| | | | |
|---|---|---|---|
| 2010/0008419 A1* | 1/2010 | Wu | H04N 19/105 375/240.15 |
| 2010/0014825 A1 | 1/2010 | Curtis et al. | |
| 2010/0017439 A1 | 1/2010 | Chen et al. | |
| 2010/0023640 A1 | 1/2010 | Vinson et al. | |
| 2010/0023977 A1 | 1/2010 | Peterfreund | |
| 2010/0035672 A1 | 2/2010 | Root | |
| 2010/0045662 A1 | 2/2010 | Boothroyd et al. | |
| 2010/0057939 A1 | 3/2010 | Zhang et al. | |
| 2010/0061443 A1 | 3/2010 | Maman et al. | |
| 2010/0064000 A1 | 3/2010 | Stroffolino | |
| 2010/0079676 A1 | 4/2010 | Kritt et al. | |
| 2010/0086023 A1 | 4/2010 | Cheung et al. | |
| 2010/0104021 A1 | 4/2010 | Schmit | |
| 2010/0124279 A1 | 5/2010 | Reddy et al. | |
| 2010/0125455 A1 | 5/2010 | Wang et al. | |
| 2010/0131776 A1 | 5/2010 | Ayars et al. | |
| 2010/0131994 A1 | 5/2010 | O'Brien | |
| 2010/0150525 A1 | 6/2010 | Walker | |
| 2010/0158101 A1 | 6/2010 | Wu et al. | |
| 2010/0161825 A1 | 6/2010 | Ronca et al. | |
| 2010/0166054 A1 | 7/2010 | Wirick | |
| 2010/0166056 A1 | 7/2010 | Perlman et al. | |
| 2010/0166058 A1 | 7/2010 | Perlman et al. | |
| 2010/0166062 A1 | 7/2010 | Perlman et al. | |
| 2010/0166063 A1 | 7/2010 | Perlman et al. | |
| 2010/0166064 A1 | 7/2010 | Perlman et al. | |
| 2010/0166065 A1 | 7/2010 | Perlman et al. | |
| 2010/0166066 A1 | 7/2010 | Perlman et al. | |
| 2010/0166068 A1 | 7/2010 | Perlman et al. | |
| 2010/0167809 A1 | 7/2010 | Perlman et al. | |
| 2010/0167816 A1 | 7/2010 | Perlman et al. | 463/30 |
| 2010/0167823 A1 | 7/2010 | Winkler | |
| 2010/0169502 A1 | 7/2010 | Knowlson et al. | |
| 2010/0172309 A1 | 7/2010 | Forenza et al. | |
| 2010/0172358 A1 | 7/2010 | Zuberi et al. | |
| 2010/0172540 A1 | 7/2010 | Davis et al. | |
| 2010/0178035 A1 | 7/2010 | Xie | |
| 2010/0178986 A1 | 7/2010 | Davis et al. | |
| 2010/0185448 A1 | 7/2010 | Meisel | |
| 2010/0195977 A1 | 8/2010 | Bennett et al. | |
| 2010/0205023 A1 | 8/2010 | Wagner | |
| 2010/0214301 A1 | 8/2010 | Li et al. | |
| 2010/0248817 A1 | 9/2010 | Anderson | 463/25 |
| 2010/0317443 A1 | 12/2010 | Cook et al. | 463/42 |
| 2011/0045913 A1 | 2/2011 | Walker et al. | |
| 2011/0107220 A1 | 5/2011 | Perlman | |
| 2011/0122063 A1 | 5/2011 | Perlman et al. | |
| 2011/0275430 A1 | 11/2011 | Walker et al. | |
| 2012/0004024 A1 | 1/2012 | Bryant et al. | |
| 2012/0004039 A1 | 1/2012 | Perry et al. | 463/42 |
| 2012/0004040 A1 | 1/2012 | Pereira et al. | 463/42 |
| 2012/0004041 A1 | 1/2012 | Pereira et al. | 463/42 |
| 2012/0004042 A1 | 1/2012 | Perry et al. | 463/42 |
| 2012/0064976 A1 | 3/2012 | Gault et al. | 463/42 |
| 2012/0172124 A1 | 7/2012 | Estrop et al. | 463/31 |
| 2012/0200583 A1 | 8/2012 | Clemie et al. | |

FOREIGN PATENT DOCUMENTS

| | | |
|---|---|---|
| KR | 20020086835 A | 11/2002 |
| WO | WO 9814898 | 4/1998 |
| WO | WO 0242921 A1 | 5/2002 |
| WO | WO 02060183 A1 | 8/2002 |
| WO | WO 02103996 A2 | 12/2002 |
| WO | WO 03075116 | 4/2003 |
| WO | WO 03047710 A2 | 6/2003 |
| WO | WO 03047710 A3 | 6/2003 |
| WO | WO 03/075116 | 9/2003 |
| WO | WO 03075116 A2 | 9/2003 |
| WO | WO 2006011153 A2 | 2/2006 |
| WO | 2009073795 A1 | 6/2007 |
| WO | WO 2007130012 A1 | 11/2007 |
| WO | 2009073792 A1 | 6/2009 |
| WO | 2009073796 A1 | 6/2009 |
| WO | 2009073797 A1 | 6/2009 |
| WO | 2009073798 A1 | 6/2009 |
| WO | 2009073799 A1 | 6/2009 |
| WO | 2009073800 A1 | 6/2009 |
| WO | 2009073801 A1 | 6/2009 |
| WO | 2009073802 A1 | 6/2009 |
| WO | 2009073819 A1 | 6/2009 |
| WO | 2009073823 A1 | 6/2009 |
| WO | 2009073824 A1 | 6/2009 |
| WO | 2009073825 A1 | 6/2009 |
| WO | 2009073826 A1 | 6/2009 |
| WO | WO 2009073827 A1 | 6/2009 |
| WO | WO 2009073828 A1 | 6/2009 |
| WO | WO 2009073830 A1 | 6/2009 |
| WO | WO 2009073831 A1 | 6/2009 |
| WO | WO 2009073832 A1 | 6/2009 |
| WO | WO 2009073833 A1 | 6/2009 |
| WO | WO 2009076172 A2 | 6/2009 |
| WO | WO 2009076177 A1 | 6/2009 |
| WO | WO 2009076178 A1 | 6/2009 |

OTHER PUBLICATIONS

Parfitt, "*Pay for Play*" gaming a reality—Article Nov. 20, 2007, p. 1-7, http://www.mcvuk.com.

Schramm, Onlive calls T5 Labs claim to key game streaming patent "irrelevant"—Article Feb. 15, 2011, VentureBeat.

Takahashi, "*Who invented cloud gaming? T5 Labs tangles with Online*"—Article Feb. 15, 2011, p. 1-4, venturebeat.com.

Onlive Fans blog—Blog Feb. 17, 2011, p. 1-8, http://onlivefans.com.

Unknown, "*New Virtual Game Console From T5 Labs Makes PC Games Playable on Televisions*"—Article Nov. 12, 2011, PR Newswire UK, http://www.prnewswire.co.uk.

G-Cluster E3 2001—Play Harder.

PCT/US2010/036977, International Preliminary Report on Patentability, Dec. 15, 2011.

PCT/US2010/036936, International Preliminary Report on Patentability, Dec. 15, 2011.

U.S. Appl. No. 12/826,489, Rui Filipe Andrade Pereira, Non-Final Office Action issued Mar. 6, 2012.

PCT/US2011/51468, International Search Report and Written Opinion, Feb. 1, 2012.

Buck, Ian et al., Tracking Graphics State for Networked Rendering, Stanford University Proc., SIGGRAPH/EUROGRAPHICSWorkshop on Graphics Hardware, 2000.

Humphreys, et al., Chromium: A Stream-Processing Framework for Interactive Rendering on Clusters, Proc. International Conference on Computer Graphics and Interactive Techniques, 2002.

Humphreys, et al., Distributed Rendering for Scalable Displays, IEEE Supercomputing 2000, Oct. 2000.

Hotel Room—Streaming Games, LodgeNet. http://www.youtube.com/watch?v=QR3mVSOlky8.

In-Flight Entertainment—Streaming Games—Panasonic's System 2000E. http://panasonic.aero/AboutUs/ProductHistory.aspx.

Bangun, Ricky A., et al., A Network Architecture for Multiuser Networked Games on Demand, International Conference on Information, Cummunications and Signal Processing, ICICS '97, pp. 1815-1819, Sep. 9-12, 1997.

BostonFUG April Writeup: Chris Allen on Brassmonkey Wifi Game Controller, Ira's website, pp. 1-2, Apr. 13, 2010, http://irahochman.com/content/bostonfug-april-writeup-chris-allen-brassmonkey-wifi-game-controller.

Clouds Without Stitches from End to End: The Ten Unique Runaware Cloud Advantages, Runaware White Paper, vol. Two, pp. 1-11 Jun. 2010.

Cronin, Eric, et al., A Distributed Multiplayer Game Server System, Electrical Engineering and Computer Science Department, University of Michigan, May 4, 2001.

Diot, Christophe, et al., A Distributed Architecture for Multiplayer Interactive Applications on the Internet, IEEE Network, pp. 6-15, Jul./Aug. 1999.

Dripps's, Jeff, Profile, pp. 1-2.

(56) References Cited

OTHER PUBLICATIONS

Gautier, Laurent, et al., Design and Evaluation of MiMaze, a Multi-Player Game on the Internet, A-188, pp. 1-15.
G-Cluster gears up for US launch, Trey Walker, GameSpot, Posted Nov. 20, 2001, The wireless gaming network developer shows off its proprietary technology. pp. 1-3, http://uk.gamespot.com/news/2826174.html.
G-cluster, Game System for Broadband Neworks, Copyright 2002, G-cluster Ltd.
Hossain, Azm Ekram, et al., End-System Architecture for Distributed Networked Multimedia Applications: Issues, Trends and Future Directions, IEEE, pp. 452-455, 1999.
Jurgelionis, A., et al., Platform for Distributed 3D Gaming, International Journal of Computer Games Technology, vol. 2009, Article ID 231863, 15 pages, doi: 10.1155/2009/231863.
Kraetel IP-STB brings advanced gaming to TV sets together with Thirdspace and G-cluster, pp. 1-2, Sep. 5, 2002, http://www.gamecluster.com/kraetel.htm.
Levoy, Marc, Polygon-Assisted JPEG and MPEG Compression of Synthetic Images, Stanford University, pp. 21-28.
Lui, John C.S., et al., An Efficient Partitioning Algorithm for Distributed Virtual Environment Systems, IEEE, pp. 193-211, 2002.
MacKenzie, I. Scott, et al., Lag as a Determinant of Human Performance in Interactive Systems, INTERCHI '93, Apr. 24-29, 1993, pp. 488-493.
Nieh, Jason, et al., Measuring Thin-client Performance Using Slow-Motion Benchmarking, ACM Transactions on Computer Systems, vol. 21, No. 1, Feb. 2003, pp. 87-115.
Pantel, Lothar et al., On the Impact of Delay on Real-Time Multiplayer Games, NOSSDAV '02, May 12-14, 2002, Miami, Florida, pp. 23-29.
Park, Jaeyong, et al., Development of a Multiuser & Multimedia Game Engine Based on TCP/IP*, IEEE, 1997.
PCT/IL98/00267, International Search Report, Sep. 30, 1998.
PCT/US01/41892, International Search Report, Dec. 17, 2001.
PCT/US06/39093, International Search Report, Feb. 28, 2007.
PCT/US07/13468, International Search Report, Mar. 3, 2008.
PCT/US07/17188, International Search Report, May 29, 2008.
PCT/US08/73780, International Search Report, Nov. 10, 2008.
PCT/US08/85556, International Search Report, Dec. 18, 2008.
PCT/US08/85558, International Search Report, Dec. 31, 2008.
PCT/US08/85595, International Search Report, Jan. 16, 2009.
PCT/US08/85601, International Search Report, Jan. 9, 2009.
PCT/US08/85603, International Search Report, Jan. 12, 2009.
PCT/US08/85605, International Search Report, Jan. 23, 2009.
PCT/US2008/085545, International Search Report, Jan. 23, 2009.
PCT/US2008/085546, International Search Report, Jan. 14, 2009.
PCT/US2008/085549, International Search Report, Jan. 23, 2009.
PCT/US2008/085550, International Search Report, Jan. 20, 2009.
PCT/US2008/085551, International Search Report, Jan. 21, 2009.
PCT/US2008/085554, International Search Report, Jan. 21, 2009.
PCT/US2008/085593, International Search Report, Jan. 21, 2009.
PCT/US2008/085598, International Search Report, Jan. 16, 2009.
PCT/US2008/085599, International Search Report, Jan. 21, 2009.
PCT/US2008/085600, International Search Report, Jan. 22, 2009.
PCT/US2008/085602, International Search Report, Jan. 13, 2009.
PCT/US2008/085606, International Search Report, Jan. 21, 2009.
PCT/US2008/085608, International Search Report, Jan. 20, 2009.
PCT/US2008/085609, International Search Report, Jan. 21, 2009.
PCT/US2008/085610, International Search Report, Jan. 21, 2009.
PCT/US2008/85560, International Search Report, Jan. 14, 2009.
PCT/US2010/036936, International Search Report and Written Opinion, Aug. 2, 2010.
PCT/US2010/036977, International Search Report and Written Opinion, Aug. 2, 2010.
Proceedings of the 2002 USENIX Annual Technical Conference, Monterey, California, USA, Jun. 10-15, 2002.
Testdrive, Runaware, Inc., pp. 1-2.
Try Before you Buy: Why Runaware TestDrive is a Great, Low Cost First Step into the Clouds, Runaware White Paper, vol. One, pp. 1-11, Jun. 2010.
U.S. Appl. No. 12/334,819, David Perry, Non-Final Office Action issued Jul. 27, 2011.
Wu, Tsong-Ho, et al., Distributed Interactive Video System Design and Analysis, IEEE, pp. 100-108, Mar. 1997.
Yang, S. Jae, et al., The Performance of Remote display Mechanisms for Thin-Client Computing, USENIX Association, Proceedings of the 2002 USENIX Annual Technical Conference, Monterey, California, pp. 1-17, Jun. 10-15, 2002.

* cited by examiner

DIFFERENTIATION FOR ACHIEVING BUFFERED DECODING AND BUFFERLESS DECODING

This application claims priority and benefit of the following provisional patent applications:

61/183,035 filed Jun. 1, 2009 and entitled "Game Server Architecture,"

61/183,037 filed Jun. 1, 2009 and entitled "Bufferless H.264 Variant,"

61/183,088 filed Jun. 2, 2009 and entitled "I/O Level Virtualization,"

61/183,546 filed Jun. 2, 2009 and entitled "Self-Spawning Game Environments,"

61/323,354 filed Apr. 12, 2010 and entitled "Artificial Frames," and

61/345,534 filed May 17, 2010 and entitled "Dynamic Game Server Including Qualifier."

The above patent applications are hereby incorporated herein by reference.

BACKGROUND

Field of the Invention

The invention is in the field of video.

Related Art

H.264 is a video standard that can be decoded by software such as Adobe Flash®. The H.264 standard, at least the Extended Profile or better, includes several different types of video frames including Key Frames, P Frames and B Frames. Key Frames generally include a greater amount of information than P Frames and B Frames. Key Frames may include enough video information to create a complete video image. When a standard H.264 decoder receives a P Frame, the decoder will use a previous Key Frame and optionally one or more previous P frames to create a complete video image. B Frames include information for future use by the decoder. For example, the information within a B Frame may not be used until 6 or 10 frames later. The B Frame is a tool for providing advance information to the decoder. Because the B Frame must be stored before use, the H.264 decoding standard requires that eight frames be buffered at the decoder.

SUMMARY

The invention includes systems and methods of communicating H.264 variant video without buffering eight frames on the decoder end. The invention further includes systems and methods for generating the H.264 variant video and for decoding the H.264 variant video. The H.264 variant video is optionally used in computer gaming or other interactive environments.

Various embodiments of the invention include a video system comprising video decoding logic configured to generate a video output configured for display on a computing device, the video processing logic comprising H.264 image generation logic configured to generate the video output using standard H.264 video, variant H.264 image generation logic configured to generate the video output using variant H.264 video without buffering at least eight frames of the variant H.264 video, type identification logic configured to differentiate between standard H.264 video and variant H.264 video and to direct received video to one of the H.264 image generation logic and the variant H.264 image generation logic based on the differentiation; memory configured to store the video processing logic; and a microprocessor configured to read the video processing logic from the memory and to execute the video processing logic.

Various embodiments of the invention include a computer readable medium having stored thereon computing instructions, the computing instructions comprising logic configured to receive encoded video; H.264 image generation logic configured to generate decoded video output using standard H.264 video, the video output being configured for display on a computing device; variant H.264 image generation logic configured to generate decoded video output using variant H.264 video without buffering at least eight frames of the variant H.264 video, the video output being configured for display on a computing device; and type identification logic configured to differentiate between standard H.264 video and variant H.264 video and to direct the received video to one of the H.264 image generation logic and the variant H.264 image generation logic based on the differentiation.

Various embodiments of the invention include a video transmission system comprising a video source configured to serve video data; an encoder configured to encode the video data according to the H.264 standard without including B Frames in the encoded video; an output configured to communicate the encoded video over a communication network; an input configured to receive the encoded video over the communication network; a decoder configured to decode the received video without buffering frames; and a display configured to display the decoded video.

Various embodiments of the invention include a method of encoding video, the method comprising receiving video data from a video source; encoding the received video compliant to the H.264 standard, the encoded video lacking B Frames; adding a flag to the encoded video, the flag including a value indicating that the encoded video lacks B frames; and sending the encoded video to a client over a communication network.

Various embodiments of the invention include a method of decoding video, the method comprising receiving encoded video; examining a frame of the encoded video to find a flag; based on the flag determining that the video is H.264 compliant and does not include B Frames; and decoding the video.

Various embodiments of the invention include a video encoder comprising encoding logic configured to receive video data and to encode the video data to a stream of video frames that do not include B Frames, the encoder optionally configured to encode according to a H.264 codec, and configured to encode according to a codec that includes B Frames; and flag logic configured to insert a flag within the stream of video frames, the flag configured to indicate that the stream of video frames does not include any B Frames.

DETAILED DESCRIPTION

Figure 1:
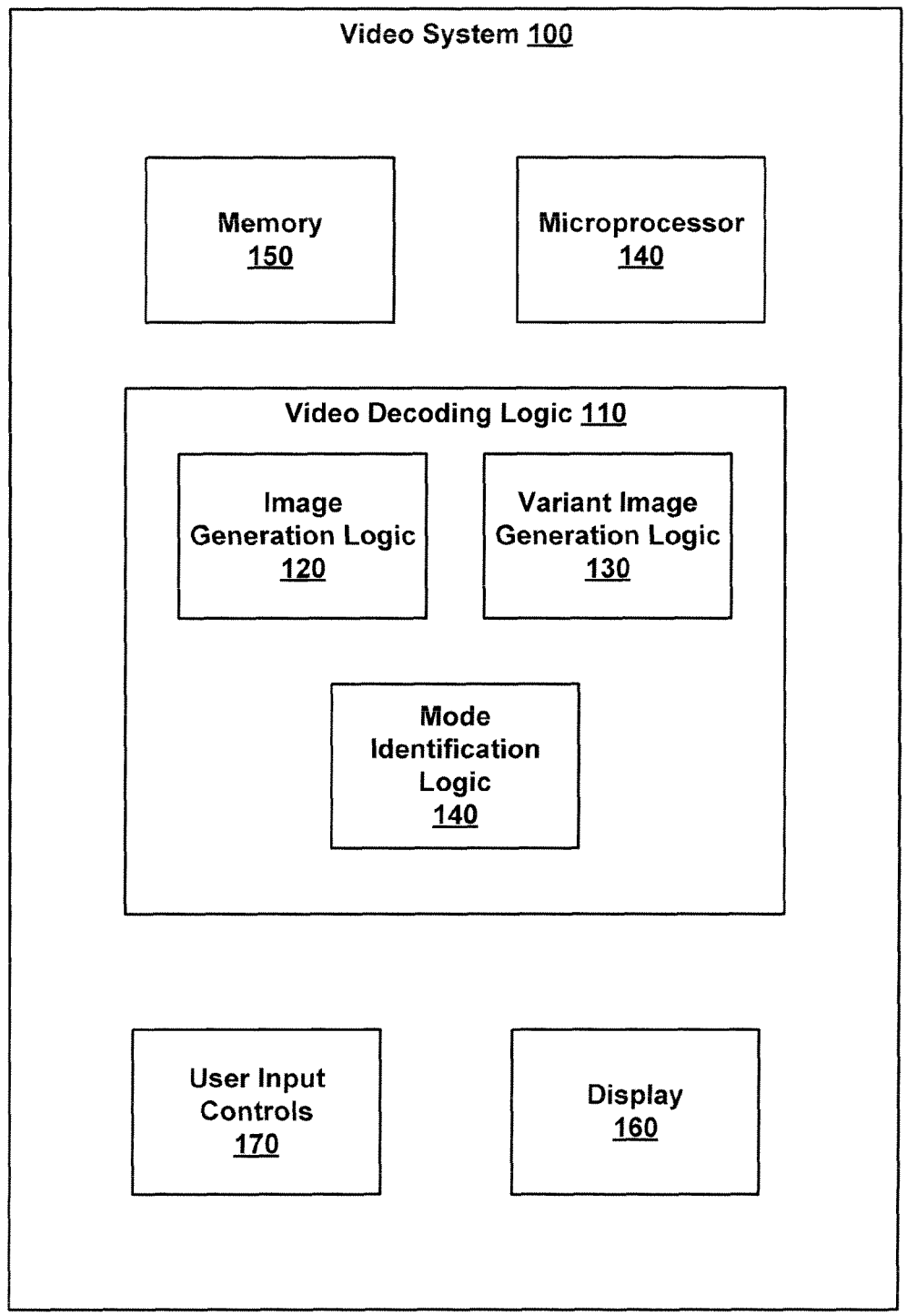
FIG. 1 illustrates a client side video system, according to various embodiments of the invention.

FIG. 1 illustrates a Video System 100, according to various embodiments of the invention. Video System 100 is configured to generate video suitable for display based on encoded video received from an external source. The encoded video can be either of two alternative types: Standard H.264 video or Variant H.264 video. In either case the encoded video discussed herein is limited to video encoded at the Extended Profile of H.264 or better, (e.g., at the Extended Profile, the Main Profile, the High Profile, the High 10 Profile, the High 4:2:2 Profile or the High 4:4:4: Predictive Profile). The Variant H.264 video has the characteristics of the profile except for the B Frames. Characteristics of these standard profiles are discussed in 61/183, 037 filed Jun. 1, 2009 and entitled "Bufferless H.264 Variant." Both of these types are compliant with the H.264 standard. H.264 is a standard for video compression, and is equivalent to MPEG-4 Part 10, or MPEG-4 AVC (for Advanced Video Coding). The final drafting work on the first version of the standard was completed in May 2003. As of May 2009, H.264 is the latest block-oriented motion-compensation-based codec standard developed by the ITU-T Video Coding Experts Group (VCEG) together with the ISO/EC Moving Picture Experts Group (MPEG), and it was the product of a partnership effort known as the Joint Video Team (JVT). The ITU-T H.264 standard and the ISO/IEC MPEG-4 Part 10 standard (formally, ISO/IEC 14496-10) are jointly maintained so that they have identical technical content.

Variant H.264 video, as referred to herein, is video that meets the H.264 standard and does not include B Frames and optionally includes a flag indicating that there are no B Frames in the video. Standard H.264 video, as referred to herein, is video that meets the H.264 standard and may include B Frames. Standard H.264 and variant H.264 video must be decoded for display on a computing device.

Video System 100 includes Video Decoding Logic 110. Video Decoding Logic 110 includes hardware, firmware and/or software stored on a computer readable medium. For example, in some embodiments Video Decoding Logic 100 includes computing instructions stored in a Memory 150. Memory 150 may include static or volatile memory, RAM, Flash Memory, SRAM, a hard drive, an optical storage media, or any other computing memory.

Video Decoding Logic 110 comprises Type Identification Logic 140, Image Generation Logic 120, and Variant Image Generation Logic 130. Type Identification Logic 140 is configured to differentiate between standard H.264 video and variant H.264 video. This differentiation typically includes examination of video frames for (single or multi-bit) flags configured to specify a particular video type. For example, a first flag value may be configured to indicate that the video is standard H.264 video and a second flag value may be configured to indication that the video is variant H.264 video. The flag is optionally disposed in a codec index and/or in the first four bits of a frame of the received video. Video Decoding Logic 110 is optionally configured to execute within a browser and/or as a browser add-on. Video Decoding Logic 110 is optionally configured to decode Flash video.

Type Identification Logic 140 is further configured to alternatively direct received video to one of the (H.264) Image Generation Logic 120 and the Variant (H.264) Image Generation Logic 130 based on the differentiation between the video types. For example, if the differentiation determines that the received video is of the standard type, then Type Identification Logic 140 will direct the received video to Image Generation Logic 120. Likewise, if the differentiation determines that the received video is of the variant type, then Type Identification Logic 140 will direct the received video to Variant Image Generation Logic 130. Type Identification Logic 140 is optionally configured to differentiate between, and direct video base on, more than two video types compliant with the H.264 standard. The determination and direction performed by Type Identification Logic 140 is optionally performed on a frame-by-frame basis.

In some embodiments, Type Identification Logic 140 is configured to assume that received video is variant H.264 and, thus, initially direct the video to Variant Image Generation Logic 130 where minimum or no buffering occurs. In these embodiments, if the assumption is found to be incorrect and a B Frame is received, the amount of buffering that is performed is increased such that B Frames are properly utilized. For example, video frames are initially sent to Variant Image Generation Logic 130, once (if) a B Frame is received, the remainder of the video frames within this video stream are then sent to Image Generation Logic 120. This may be accomplished by merely changing the size of the buffer, e.g., from zero to eight frames.

Image Generation Logic 120 is configured to decode the received standard H.264 compatible video to generate video images configured for display on a Display 160. Image Generation Logic 120 is typically configured to buffer eight or more video frames of the received video during the decoding process. The decoded output of Image Generation Logic 120 includes an image configured for display on Display 160. Image Generation Logic 120 is optionally fully compatible with the H.264 standard.

Variant Image Generation Logic 130 is configured to generate the video output using variant H.264 video without buffering at least eight frames of the variant H.264 video. In various embodiments, Variant Image Generation Logic 120 is configured to buffer zero, one, two, four or six frames during decoding. The decoded video output of Variant Image Generation Logic 130 includes an image configured for display on Display 160. In various embodiments, Variant Image Generation Logic 130 is configured to generate the video output within 25, 50, 100, 150, 175, 190 or 195 milliseconds of receiving the encoded variant H.264 video. Variant Image Generation Logic 130 is not fully compliant with the H.264 standard because it does not handle B Frames.

Image Generation Logic 120 and Variant Image Generation Logic 130 optionally share computing instructions. In some embodiments, the primary difference between Image Generation Logic 120 and Variant Image Generation Logic 130 is that Variant Image Generation Logic 130 includes a smaller, or no, video receive buffer. For example, in some embodiments Image Generation Logic 120 and Variant Image Generation Logic 130 share the same computing instructions but Image Generation Logic 120 additionally includes a receive buffer.

Optional User Input Controls 170 are configured for a user to input control commands These commands may be configured to control the presentation or content of the received video. For example, in some embodiments User Input Controls 170 are configured to control a video game that generates the received video. In some embodiments, User Input Controls 170 are used to select among video sources and/or to determine the resolution at which video should be displayed on Display 160. User Input Controls 170 may include a keyboard, joystick, touch screen, mouse, trackball, touch pad, position or motion sensitive control, or any other standard input device.

Optional Display 160 is a video display of a computing device. Display 160 may be part of a computer monitor, a television, a game device, a telephone, a game console, or the like. Display 160 may be configured to display video at one or more of the numerous standard video resolutions.

Figure 2:
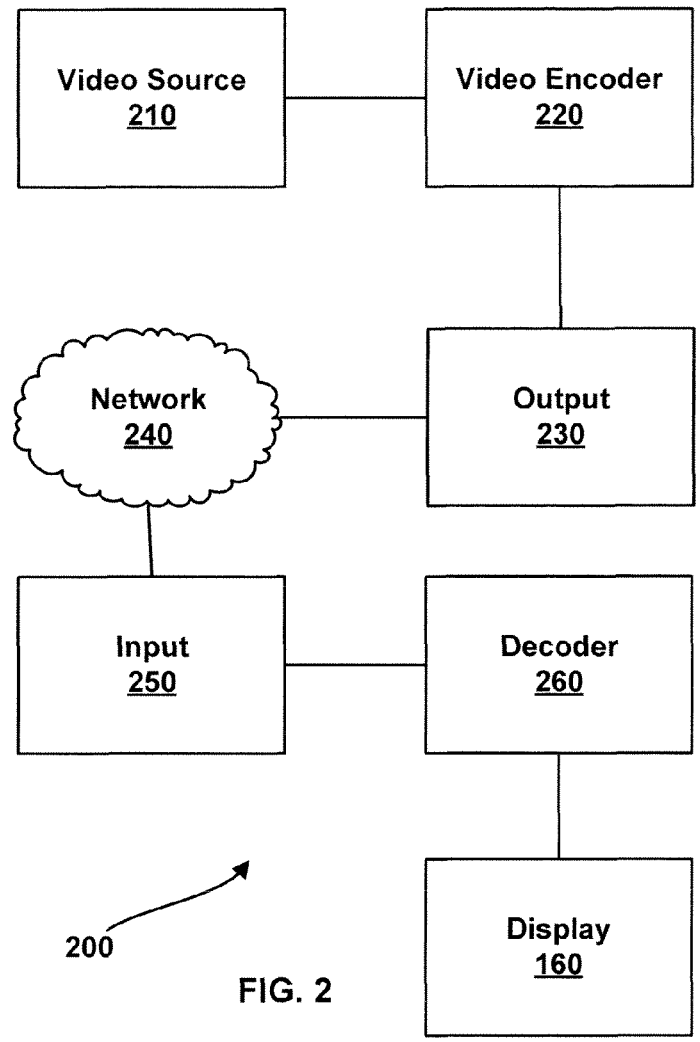
FIG. 2 illustrates a video transmission system, according to various embodiments of the invention.

FIG. 2 illustrates a Video Transmission System 200, according to various embodiments of the invention. Video Transmission System 200 is configured to generate video, encode the generated video to a H.264 compliant encoded form, transmit the encoded video over a computing network, receive the encoded video at a client, decode the encoded video and display the decoded video. The H.264 compliant encoded video does not include B Frames.

More specifically, Video Transmission System 200 includes a server side Video Source 210 configured to serve stored video and/or serve video generated in real-time. Video Source 210 may include a video camera, a video game server, a real-time simulator, an interactive video system, computer readable media configured to store video data, a game engine, a graphics processing unit (GPU), and/or the like. The video generated or served by Video Source 210 may include encoded or raw video. Video Source 210 is optionally configured to serve more than one video stream. For example, Video Server 210 may be configured to execute one or more computer game and to deliver game video to one or more targets, e.g., clients. Video Server 210 is optionally configured to generate and serve real-time video of real-time events using a camera.

Video Server 210 is optionally configured to provide a video stream using more than one codec in series, and to switch between the more than one codec during transmission of the video stream. For example Video Server 210 may be configured to serve a video stream using a first codec such as H.264 and then change the video steam to a different codec mid stream. This change may be reversed without significantly interrupting the video stream.

Video Transmission System 200 further includes a Video Encoder 220 configured to encode the video data to an encoded form compliant with the H.264 standard without including B Frames in the encoded video, e.g., to generate variant H.264 video. Such encoding typically results in a lower bit transmission capacity relative to an encoding wherein B Frames are included. An approach to encoding H.264 without B Frames is to set the encoding options—-bframes <integer> or -bf<integer> (in x264 or FFmpeg respectively) to zero. This implicitly turns off a variety of other B Frame options. Video Encoder 220 may include hardware, firmware and/or software stored on a computer readable medium. In some embodiments, Video Encoder 220 includes a computing device having several input channels configured to receive video from a plurality of Video Source 210. More than one instance of Video Encoder 220 may received video from the same Video Source 210. Video Encoder 220 is optionally included within Video Source 210.

Video Encoder 220 is optionally configured to add a flag to the encoded video. For example Video Encoder 220 may add a flag configured to differentiate between H.264 compliant video that includes B Frames and variant H.264 compliant video that does not include B Frames. This flag may include one or more bits and is optionally disposed in a codec index or within the first few bits of a video frame.

Video Transmission System 200 further includes an Output 230 configured to communication over a Network 240. Output 230 may be any network interface suitable for communicating video data. For example, a telephone interface, a TCP/IP interface, UDP (or alternative transport layers), an Ethernet interface, an internet connection, and/or the like. Video Source 210, Video Encoder 220 and/or Output 230 are considered the "server side" of Video Transmission System 200 and are optionally embodied in the same computing device.

On a client side, Video Transmission System 200 further includes an Input 250 configured to receive the variant H.264 video. Input 250 may include a wireless connection, an infrared connection, a telephone interface, a TCP/IP interface, UDP (or alternative transport layers), an Ethernet interface, a cable TV connection, a satellite receiver, an internet connection, and/or the like.

Video Transmission System 200 further includes a Decoder 260 typically configured to decode the H.264 compliant and B Frame free video signal, e.g., decode variant H.264 video. Decoder 260 optionally includes an embodiment of Video System 100 or parts thereof. For example, Decoder 260 may include Memory 150, Microprocessor 140 and Video Decoding Logic 110. Decoder 260 is optionally configured to alternatively decode the video received at Input 250 with and without buffering frames. Decoder 260 and Video Decoding Logic 110 are optionally configured to decode Adobe Flash®. Decoding without B Frames requires less time because the B Frames do not have to be buffered. This reduces lag relative to decoding with B Frames.

Input 250, Decoder 260 and Display 160 are optionally, at least in part, included in a computing device such as a television, a television console, a table computer, a game console, a game device, a personal computer, a tablet computer, a telephone, an interactive display device, a satellite receiver, a cable box, a wireless telephone, a game controller, a remote control, and/or the like. Video Source 210 is optionally configured to receive commands, e.g., game commands, from this computing device and configured to generate the video responsive to these commands. Input 250, Decoder 260 and Display 160 are considered the "client side" of Video Transmission System 200. The server and client sides of Video Transmission System 200 may each be found alone in various embodiments.

Figure 3:
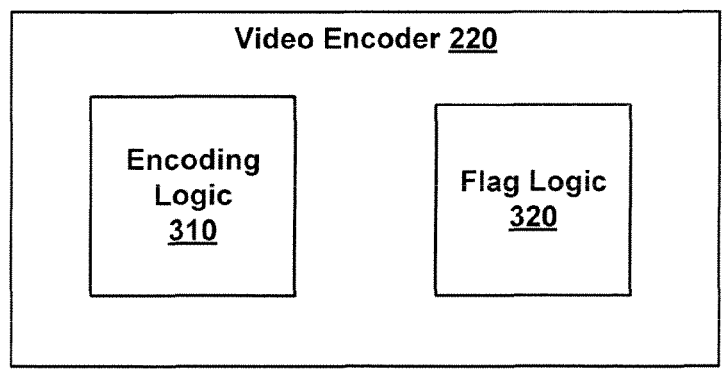
FIG. 3 illustrates a video encoder, according to various embodiments of the invention.

FIG. 3 illustrates further details of Video Encoder 220, according to various embodiments of the invention. Video Encoder 220 includes Encoding Logic 310 and optional Flag Logic 320. Video Encoder 220 is configured to receive video data from Video Source 210 and to encode the received video data according to a codec, such as H.264, that normally includes B Frames. However, Encoding Logic 310 is configured to not include B Frames in the resulting stream of encoded video frames. Not including B Frames can result in a need to communicate a greater number of bits than would be required if B Frames were used.

Flag Logic 320 is configured to insert a flag within the stream of video frames. This flag configured to indicate that the stream of video frames does not include any B Frames. The flag may include or be included in a codec index or in the first few (1, 2, 3, 4 or 8) bits, of each frame. The insertion of the flag may occur during the encoding process.

Figure 4:
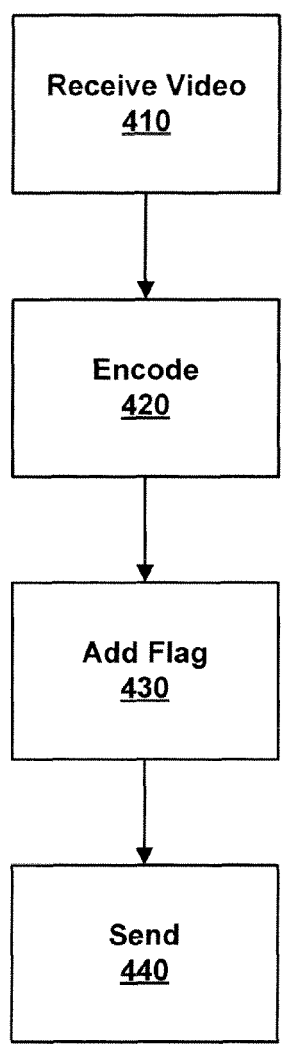
FIG. 4 illustrates a method of encoding video, according to various embodiments of the invention.

FIG. 4 illustrates a method of encoding video, according to various embodiments of the invention. This method may be performed using, for example, the server side of Video Transmission System 200.

In a Receive Video Step 410 video is received by Video Encoder 220 from Video Source 210. The received video may be raw video and/or video already encoded. The video may be received over the internet, over a local network, or from a source more directly connected to Video Encoder 220, such as a GPU.

In an Encode Step 420 the received video is encoded compliant to the variant H.264, e.g., the received video is encoded to the H.264 standard and also encoded such that the video lacks B Frames. This encoding may be from raw video, from some other encoding or from a standard H.264 compliant encoding that included B Frames. Encode Step 420 is typically performed using Encoding Logic 310.

In an optional Add Flag Step 430, Video Encoder 220 adds a flag to the encoded video using Flag Logic 320. This flag includes a value indicating that the encoded video lacks B frames. Add Flag Step 430 is optionally performed in parallel with Encode Step 420. For example, a flag may be added as each frame is encoded. The flag may include or be included in a codec index or in the first few (1, 2, 3, 4 or 8) bits, of each frame.

In a Send Step 440 the encoded video is sent to a client over a communication network. For example, the variant H.264 video including the flag may be sent to the client side of Video Transmission System 200 via Network 240. The video is optionally sent as it is encoded, as a video stream.

Figure 5:
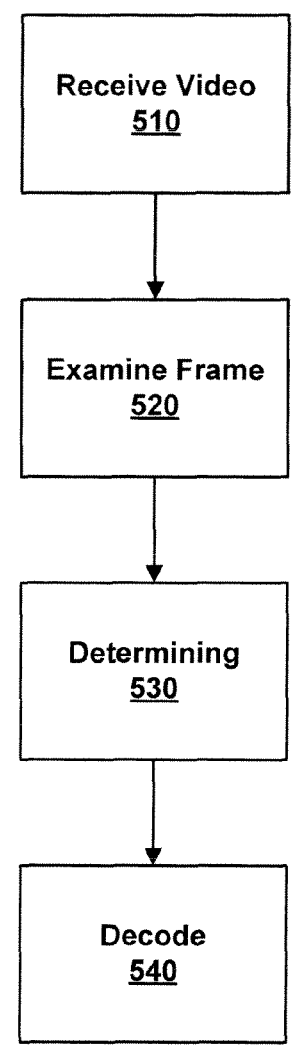
FIG. 5 illustrates a method of decoding video, according to various embodiments of the invention.

FIG. 5 illustrates a method of decoding video, according to various embodiments of the invention. This method may be performed using, for example, the client side of Video Transmission System 200. This method is typically performed following the method illustrated in FIG. 4, although optionally by a different party.

In a Receive Video Step 510, the variant H.264 encoded video is received by the client side of Video Transmission System 200.

In an Examine Frame Step 520 a frame of the received encoded video is examined to find a flag identifying the encoding as being without B Frames. For example, being variant H.264 encoding rather than standard H.264 encoding. Alternatively, in embodiments where the video is first assumed to be without B Frames, Examine Frame Step 520 includes monitoring to see if a B Frame has been received, and does not necessarily include finding a flag.

In a Determining Step 530 the flag found in Examine Frame Step 520 is used to determine that the received video is H.264 compliant and does not include B Frames, e.g., is variant H.264. This determination may be performed by comparing a value of the found flag with values expected for different codecs. Determine Step 530 is optionally performed by Decoder 260. Alternatively, in those embodiments wherein it is assumed that the video is without B Frames, Determining Step 530 includes finding that a B Frame has been received and based on that finding determining that the received video includes B Frames and, thus, must be buffered as it is decoded to properly process the B Frames.

In a Decode Step 540 the received video is decoded without buffering at least eight video frames, if the video has been determined (or assumed) to be without B Frames. In various embodiments, the decoding is performed within 25, 50, 100, 150, 175, 190 or 195 milliseconds of receiving the encoded variant H.264 video at a client. In various embodiments the decoding is performed while buffering zero, one, two, four or six frames during decoding. Decode Step 540 is optionally performed by Decoder 260. The decoded video is optionally displayed using Display 160. If the video has been determined to include B Frames, then a greater amount of buffering is used so that the B Frames can be properly processed.

The methods illustrated in FIGS. 3 and 4 are optionally performed by different parties in cooperation. Further, these methods may be performed by computing systems other than those illustrated in FIGS. 1 and 2.

Several embodiments are specifically illustrated and/or described herein. However, it will be appreciated that modifications and variations are covered by the above teachings and within the scope of the appended claims without departing from the spirit and intended scope thereof. For example while the H.264 standard is discussed herein by way of example, the systems and methods discussed herein are applicable to other video codecs that normally include frame buffering to decode. The systems and methods discussed herein can be applied to other members of the "family of standards" of which H.264 is a member. Examples of this family are described in U.S. provisional patent application Ser. No. 61/183,037 filed Jun. 1, 2009 and entitled "Bufferless H.264 Variant." The systems and methods described herein may be applied to audio as well as video data. Some embodiments of the invention include the use of PIR (Periodic Intra Refresh) to make the sizes of transmitted video frames more consistent, and reduce the maximum size. PIR includes placing I frame data in P frames. As a result, I frames are not transmitted as often.

Computing devices referred to herein can comprise an integrated circuit, a microprocessor, a personal computer, a server, a distributed computing system, a communication device, a network device, or the like, and various combinations of the same. A computing system may also comprise volatile and/or non-volatile memory such as random access memory (RAM), dynamic random access memory (DRAM), static random access memory (SRAM), magnetic media, optical media, nano-media, a hard drive, a compact disk, a digital versatile disc (DVD), and/or other devices configured for storing analog or digital information. The various examples of logic noted herein can comprise hardware, firmware, or software stored on a computer-readable medium, or combinations thereof. A computer-readable medium, as used herein, expressly excludes paper. Computer-implemented steps of the methods noted herein can comprise a set of instructions stored on a computer-readable medium that when executed cause the computing system to perform the steps. A computing system programmed to perform particular functions pursuant to instructions from program software is a special purpose computing system for performing those particular functions. Data that is manipulated and/or transformed by a special purpose computing system while performing those particular functions is at least electronically saved in buffers of the computing system, physically changing the special purpose computing system from one state to the next with each change to the stored data.

The embodiments discussed herein are illustrative of the present invention. As these embodiments of the present invention are described with reference to illustrations, various modifications or adaptations of the methods and or specific structures described may become apparent to those skilled in the art. All such modifications, adaptations, or variations that rely upon the teachings of the present invention, and through which these teachings have advanced the art, are considered to be within the spirit and scope of the present invention. Hence, these descriptions and drawings should not be considered in a limiting sense, as it is understood that the present invention is in no way limited to only the embodiments illustrated.

What is claimed is:
1. A video system comprising:
 a video decoding microprocessor configured to generate a video output to be displayed on a display device, the video decoding microprocessor comprising:
  a standard H.264 image generation logic circuit including a buffer, a variant H.264 image generation logic circuit lacking a buffer; and a type identification logic circuit in communication with the standard H.264 image generation logic circuit and the variant H.264 image generation logic circuit, wherein the type identification logic is configured to receive a video and configured to differentiate between a standard H.264 video and a variant H.264 video based on an inclusion and an exclusion of B frames in the received video, the type identification logic circuit further configured to direct the standard H.264 video to the standard H.264 image generation logic circuit and the variant H.264 video to the variant H.264 image generation logic circuit based on the differentiation, wherein the standard H.264 image generation logic circuit is configured to decode the standard H.264 video to generate a portion of the video output, wherein the variant H.264 image generation logic circuit is configured to decode the variant H.264 video without buffering any frames of the variant H.264 video during the decode of the variant H.264 video, wherein the variant H.264 image generation logic is configured to decode the variant H.264 video to generate a portion of the video output; and a memory device coupled to the video decoding microprocessor and configured to store video decoding logic for generating the video output.

2. The video system of claim 1, further comprising user input controls and the display device.

3. The video system of claim 1, wherein the standard H.264 image generation logic circuit and the variant H.264 image generation logic circuit share computing instructions.

4. The video system of claim 1, wherein the video decoding logic is configured to execute within a browser.

5. The video system of claim 1, wherein the type identification logic circuit is configured to differentiate between the standard H.264 video and the variant H.264 video by examining a codec index of the received video.

6. The video system of claim 1, wherein the type identification logic circuit is configured to differentiate between the standard H.264 video and the variant H.264 video by detecting a flag within the received video.

7. A non-transitory computer readable medium having stored thereon computing instructions, the computing instructions comprising:

logic configured to receive encoded video;

standard H.264 image generation logic for using a buffer during execution of the standard H.264 image generation logic;

variant H.264 image generation logic; and type identification logic configured to differentiate between a standard H.264 video and a variant H.264 video based on an inclusion and exclusion of B frames in the received encoded video and to direct the standard H.264 video to the standard H.264 image generation logic and the variant H.264 video to the variant H.264 image generation logic based on the differentiation;

wherein the standard H.264 image generation logic is configured to decode the standard H.264 video to generate a decoded video output, the decoded video output generated by the standard H.264 image generation logic being configured for display on a computing device;

wherein the variant H.264 image generation logic is configured to decode the variant H.264 video without using a buffer to buffer any frames of the variant H.264 video during the decode of the variant H.264 video, wherein the variant H.264 image generation logic is configured to decode the H.264 video to generate a decoded video output, the decoded video output generated by the variant H.264 image generation logic being configured for display on a computing device.

8. The non-transitory computer readable medium of claim 7, wherein the variant H.264 image generation logic is configured to generate the decoded video output at an Extended Profile, or a Main Profile, or a High Profile, or a High 10 Profile, or a High 4:2:2 Profile, or a High 4:4:4 Predictive Profile.

9. The non-transitory computer readable medium of claim 7, wherein the variant H.264 generation logic is configured to generate the decoded video output less than 150 milliseconds after the variant H.264 video is received at a client.

10. The video system of claim 1, wherein the variant H.264 image generation logic circuit is configured to generate the portion of the video output using the variant H.264 video at an Extended Profile, or a Main Profile, or a High Profile, or a High 10 Profile, or a High 4:2:2 Profile, or a High 4:4:4 Predictive Profile.

11. The video system of claim 1, wherein the display device is configured to display the portion of the video output generated by and received from the variant H.264 image generation logic circuit.

12. The video system of claim 1, wherein the variant H.264 image generation logic circuit is configured to decode the variant H.264 video in a time period between 25 milliseconds and 175 milliseconds after being received by a client.

13. A method comprising:

receiving a video, the video including a plurality of standard H.264 video frames and a plurality of variant H.264 video frames;

differentiating between the standard H.264 video frames and the variant H.264 video frames based on an inclusion and an exclusion of B frames in the received video;

directing the standard H.264 video frames to a standard H.264 image generation logic circuit;

directing the variant H.264 video frames to a variant H.264 image generation logic circuit based on said differentiating;

decoding the standard H.264 video frames to generate a portion of a video output; and decoding the variant H.264 video frames without buffering any of the variant H.264 video frames during the decoding of the variant H.264 video frames, wherein said decoding the variant H.264 video frames is performed to generate a portion of the video output.

14. The method of claim 13, wherein said differentiating between the standard H.264 video frames and the variant H.264 video frames is performed by examining a codec index of the received video.

15. The method of claim 13, wherein said differentiating between the standard H.264 video frames and the variant H.264 video frames is performed detecting a flag within the received video.

16. The method of claim 13, wherein said decoding the variant H.264 frames is performed using an Extended Profile, or a Main Profile, or a High Profile, or a High 10 Profile, or a High 4:2:2 Profile, or a High 4:4:4 Predictive Profile.

17. The method of claim 13, wherein said decoding the variant H.264 video frames is performed in a time period ranging from 25 milliseconds to 175 milliseconds.

* * * * *